United States Patent
Hirasawa et al.

(10) Patent No.: US 6,349,592 B1
(45) Date of Patent: Feb. 26, 2002

(54) INTAKE AIR QUANTITY CALCULATING APPARATUS FOR AN INTERNAL COMBUSTION ENGINE WITH A VARIABLE VALVE TIMING CONTROL MECHANISM

(75) Inventors: Takahiko Hirasawa; Yoshiaki Yoshioka, both of Kanagawa; Hatsuo Nagaishi, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/634,880

(22) Filed: Aug. 7, 2000

(30) Foreign Application Priority Data

Aug. 6, 1999 (JP) .......................................... 11-223683

(51) Int. Cl.$^7$ .......................... F02D 41/18; F02D 13/02
(52) U.S. Cl. ......................................... 73/118.1; 701/36
(58) Field of Search ................................ 73/116, 117.2, 73/117.3, 118.1, 119 A; 701/29, 31, 34, 36; 123/90.15

(56) References Cited

U.S. PATENT DOCUMENTS

| | | | | |
|---|---|---|---|---|
| 4,399,698 A | * | 8/1983 | Hiromasa et al. | 73/118.1 |
| 4,400,974 A | * | 8/1983 | Nishimura et al. | 73/118.1 |
| 4,449,397 A | * | 5/1984 | Lauterbach | 73/118.1 |
| 5,220,828 A | * | 6/1993 | Sodeno et al. | 73/118.1 |
| 5,644,073 A | * | 7/1997 | Matsuno et al. | 73/118.1 |
| 6,079,381 A | * | 6/2000 | Morikawa et al. | 123/90.15 |

FOREIGN PATENT DOCUMENTS

JP     11-62674     3/1999

* cited by examiner

Primary Examiner—George Dombroske
(74) Attorney, Agent, or Firm—Foley & Lardner

(57) ABSTRACT

An intake air quantity calculating apparatus for an internal combustion engine equipped with a variable valve timing control mechanism is provided. By the apparatus, an intake pipe pressure is detected or estimated. An intake air pulsation rate is determined on the basis of the detected or estimated intake pipe pressure and engine speed. An air flow error correction term basic value is determined on the basis of a throttle valve opening degree and engine speed. The air flow error correction term basic value is corrected on the basis of the intake air pulsation rate, whereby to determine an air flow error correction term for correcting an error in detection of an intake air quantity by an air flow meter. By the air flow error correction term, an intake air quantity detected by an air flow meter is corrected, whereby it becomes possible to improve the accuracy in calculation of the intake air quantity. In case the intake pipe pressure is to be estimated, an intake pipe pressure basic value is determined from the throttle valve opening degree and the engine speed. The intake pipe pressure basic value is corrected on the basis of a closing timing of an intake valve, whereby to estimate the intake pipe pressure. A method of calculating an intake air quantity of the engine through correction of an intake air quantity detected by an air flow meter is also provided.

9 Claims, 7 Drawing Sheets

INTAKE AIR QUANTITY CALCULATING APPARATUS FOR AN INTERNAL COMBUSTION ENGINE WITH A VARIABLE VALVE TIMING CONTROL MECHANISM

BACKGROUND OF THE INVENTION

The present invention relates in general to an internal combustion engine equipped with a variable valve timing (VVT) control mechanism capable of control ling the opening and closing timings of the intake and exhaust valves, and more particularly to an intake air quantity calculating apparatus for use in an internal combustion engine with such a VVT control mechanism, for calculating an intake air quantity for control of a fuel injection quantity, etc. by correcting an intake air quantity detected by an airflow meter by using an airflow error correcting term. The present invention further relates to a method of calculating an intake air quantity in such an internal combustion engine.

In control of a fuel injection quantity, etc. on the basis of an intake air quantity detected by an airflow meter, since an airflow meter, particularly a hot-wire airflow meter produces an error in detection of air flow under an influence of an intake air pulsation, it has heretofore been practiced to determine, as a parameter of engine load for knowing the magnitude of pulsation, the quantity of air passing through a throttle valve from a throttle valve opening degree and engine speed ($\alpha$–N) and determine an airflow error correction term or coefficient KTRM from the quantity of air passing through the throttle valve and the engine speed to correct the intake air quantity by using the airflow error correction term KTRM. It has further been practiced to modify the correction term KTRN in accordance with an EGR rate as disclosed in Japanese patent provisional publication No. 11-62674.

SUMMARY OF THE INVENTION

However, in the engine equipped with a WVT control mechanism capable of variably controlling the opening and closing timings of the intake and exhaust valves (for example, in an engine adapted to control the intake air quantity on the basis of the closing timing of the intake valve), the load of the engine (i.e., the throttle valve opening degree and the engine speed) and the intake pipe pressure does not correspond to each other, so that the load of the engine and the magnitude of pulsation does not correspond to each other, thus causing a problem that adequate or accurate correction of the intake air quantity cannot be attained.

It is accordingly an object of the present invention to provide an intake air quantity calculating apparatus for an internal combustion engine equipped with a VVT control mechanism which can attain an improved accuracy in calculation of the intake air quantity through accurate correction of an air flow meter-detected intake air quantity in accordance with the magnitude of pulsation.

It is a further object of the present invention to provide a method of calculating an intake air quantity of an internal combustion engine with a variable valve timing control mechanism, through correction of an intake air quantity detected by an air flow meter, can attain an improved accuracy in calculation.

To accomplish the above objects, the present invention provides an intake air quantity calculating apparatus for an internal combustion engine with a variable valve timing control mechanism. The apparatus comprises an air flow meter for detecting an intake air quantity of the engine, and a calculator for calculating a corrected intake air quantity through correction of the intake air quantity detected by the air flow meter. The calculator includes a pulsation rate determining section for determining an intake air pulsation rate on the basis of an intake pipe pressure and an engine speed of the engine, an air flow error correction term determining section for determining an air flow error correction term for correction of an error of the intake air quantity detected by the air flow meter, on the basis of the intake air pulsation rate, and a correcting section for correcting the intake air quantity detected by the air flow meter by using the air flow error correction term.

Further, the present invention provides a method of calculating an intake air quantity of an internal combustion engine with a variable valve timing control mechanism, through correction of an intake air quantity detected by an air flow meter. The method comprises determining an intake air pulsation rate on the basis of an intake pipe pressure and an engine speed of the engine, determining an air flow error correction term for correction of an error of the intake air quantity detected by the air flow meter, on the basis of the intake air pulsation rate, and correcting the intake air quantity detected by the air flow meter by using the air flow error correction term.

DESCRIPTION OF A PREFERRED EMBODIMENT

Figure 1:
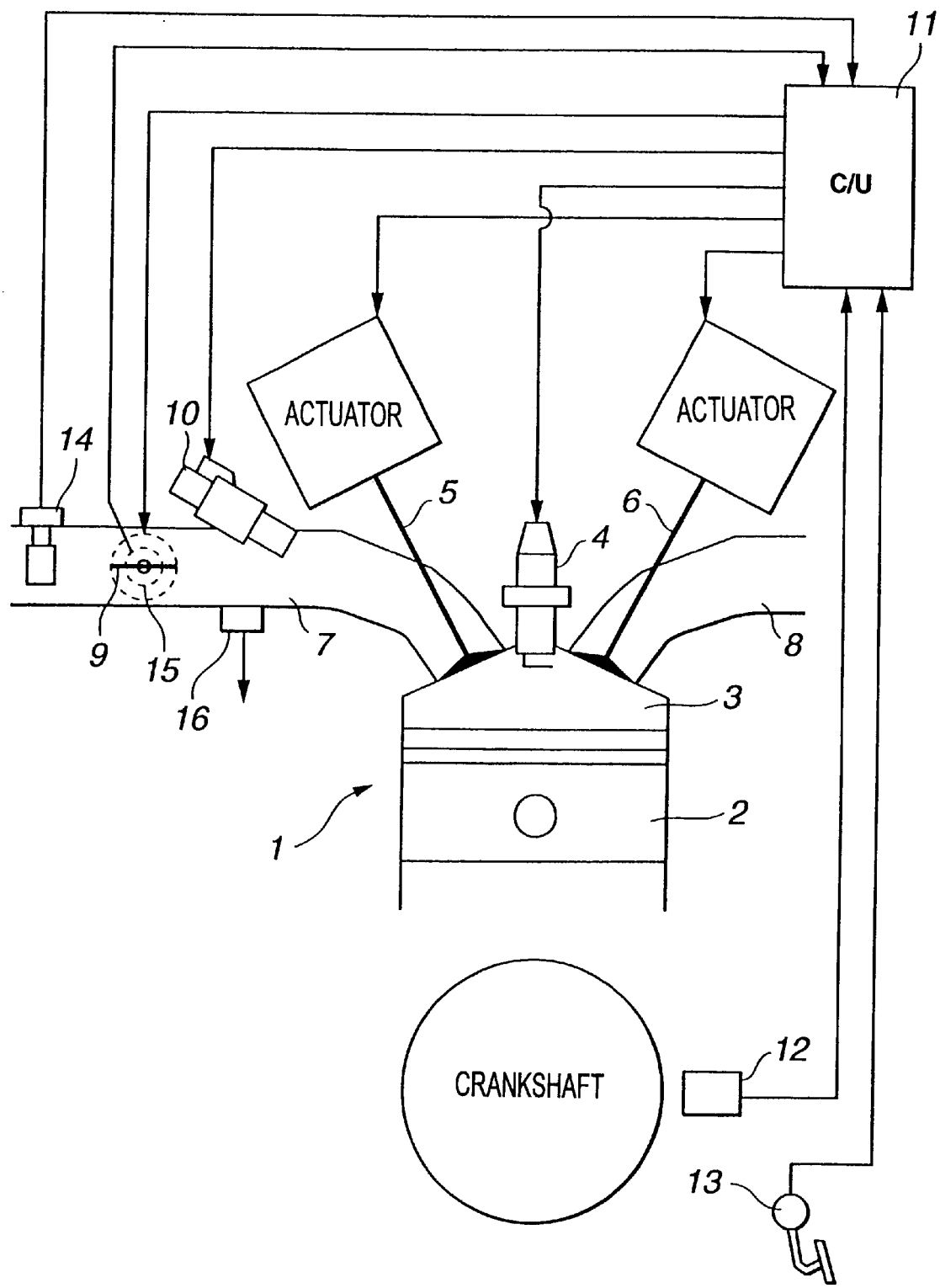
FIG. 1 is a schematic view of an internal combustion engine provided with a variable valve timing (VVT) control mechanism and an intake air quantity calculating apparatus according to an embodiment of the present invention.

Referring first to FIG. 1, an internal combustion engine is generally indicated by 1 and has piston 2 and combustion chamber 3 at each cylinder. In combustion chamber 3 is provided a pair of intake valve 5 and exhaust valve 6. Engine 1 further has an intake system including intake passage or pipe 7 and an exhaust system including exhaust passage or pipe 8.

Figure 2:
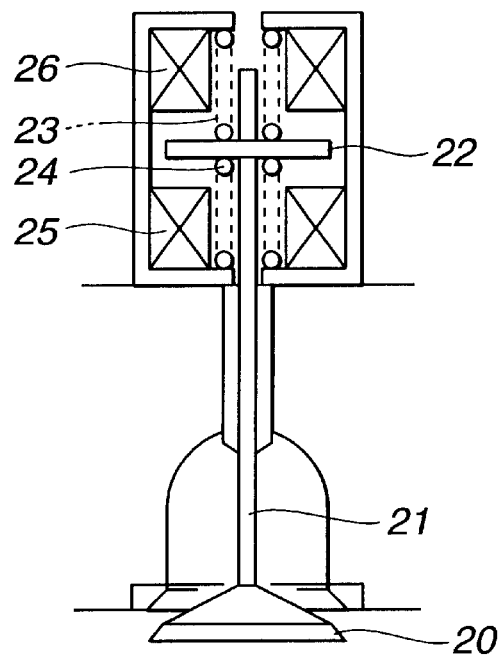
FIG. 2 is a schematic view of an electromagnetic actuator for intake and exhaust valves of the engine of FIG. 1.

An electromagnetic actuator for actuating intake and exhaust valves 5 and 6 is constructed basically as shown in FIG. 2 wherein indicated by 20 is a valve representative of either of intake valve 4 and exhaust valve 5. The actuator includes movable element or armature 22 in the form of a disc and attached to valve stem 21 of valve 20. Movable element 22 is urged by springs 25 and 26 toward a neutral position. Valve opening solenoid 25 and valve closing solenoid 26 are disposed under and above movable element 22, respectively.

For opening valve 20, upper valve closing solenoid 26 is deenergized and then lower valve opening solenoid 25 is energized to attract movable element 22 downward thereto for thereby causing valve 20 to move away from its associated seat to open a port. On the contrary, for closing valve 20, lower valve opening solenoid 25 is deenergized and thereafter upper valve closing solenoid 26 is energized to attract movable element 22 upward thereto for thereby causing valve 20 to be placed on its associated seat to close a port. The actuator constitutes part of a variable timing control mechanism for variably controlling the opening and closing timings of intake and exhaust valves 5 and 6.

While the variable valve timing control mechanism in this embodiment is of the electromagnetic type, it can be of the hydraulic type.

Referring back to FIG. 1, intake pipe 7 is provided with electronically controlled throttle valve 9.

Intake pipe 7 is further provided with electromagnetic fuel injection valve 10 at each intake port for each cylinder.

The operations of intake valve 5, exhaust valve 6, electronically controlled throttle valve 9, fuel injection valve 10 and spark plug 4 are controlled by an electronic control unit 11 to which are supplied signals from crank angle sensor (i.e., engine speed detecting device) 12 which outputs a crank angle signal in timed relation to engine speed and is thereby capable of detecting engine speed Ne together with an crank angle position, accelerator pedal sensor 13 for detecting an amount APO of accelerator pedal operation (i.e., amount of accelerator pedal depression), air flow meter 14 for detecting intake air quantity Qa at a portion of intake pipe 7 upstream of throttle valve 9, and throttle sensor (i.e., throttle valve opening degree detecting device) 15 for detecting the opening degree of throttle valve 9.

In case intake pipe pressure sensor (i.e., intake pipe pressure detecting device) 16 is provided in intake pipe 7 at a location downstream of throttle valve 9, its signal is also supplied to control unit 11.

In engine 1, the opening and closing timings of electromagnetically driven intake valve 5 and exhaust valve 6 are controlled with a view to improving the fuel consumption by decreasing the pumping loss. Specifically, opening timing IVO of intake valve 5 is set at the timing adjacent the top dead center and closing timing IVC of intake valve 5 is variably controlled for controlling the intake air quantity in such a manner as to attain a target air quantity corresponding to a required torque determined from amount APO of acceleration pedal operation and engine speed Ne, thus causing engine 1 to perform substantially a non-throttle operation. In this instance, electronically controlled throttle valve 9 is controlled so as to provide such an opening degree that enables to attain small negative pressure (about −50 mmHg) under a predetermined engine operating condition (excluding a high load engine operating condition).

Opening timing EVO and closing timing EVC of exhaust valve 6 are controlled so as to attain the best thermal efficiency.

In the meantime, under a particular engine operating condition (e.g., at idling or at low-load, cold engine operating condition) in which the intake air quantity control through control of closing timing IVC of intake valve 5 deteriorates the combustion condition, the intake air quantity can be controlled by fixing closing timing IVC of intake valve 5 at the bottom dead center and variably controlling opening degree TVO of electronically controlled throttle valve 9.

While the fuel injection timing and fuel injection quantity of fuel injection valve 10 are controlled based on the engine operating condition, the fuel injection quantity is controlled basically on the basis of intake air quantity Qa detected by hot-wire air flow meter 14 so as to attain a desired air-fuel ratio.

The ignition timing of spark plug 4 is controlled on the basis of the engine operating condition so as to be set at MBT (optimum ignition timing for torque) or at the knock limit.

Figure 4:
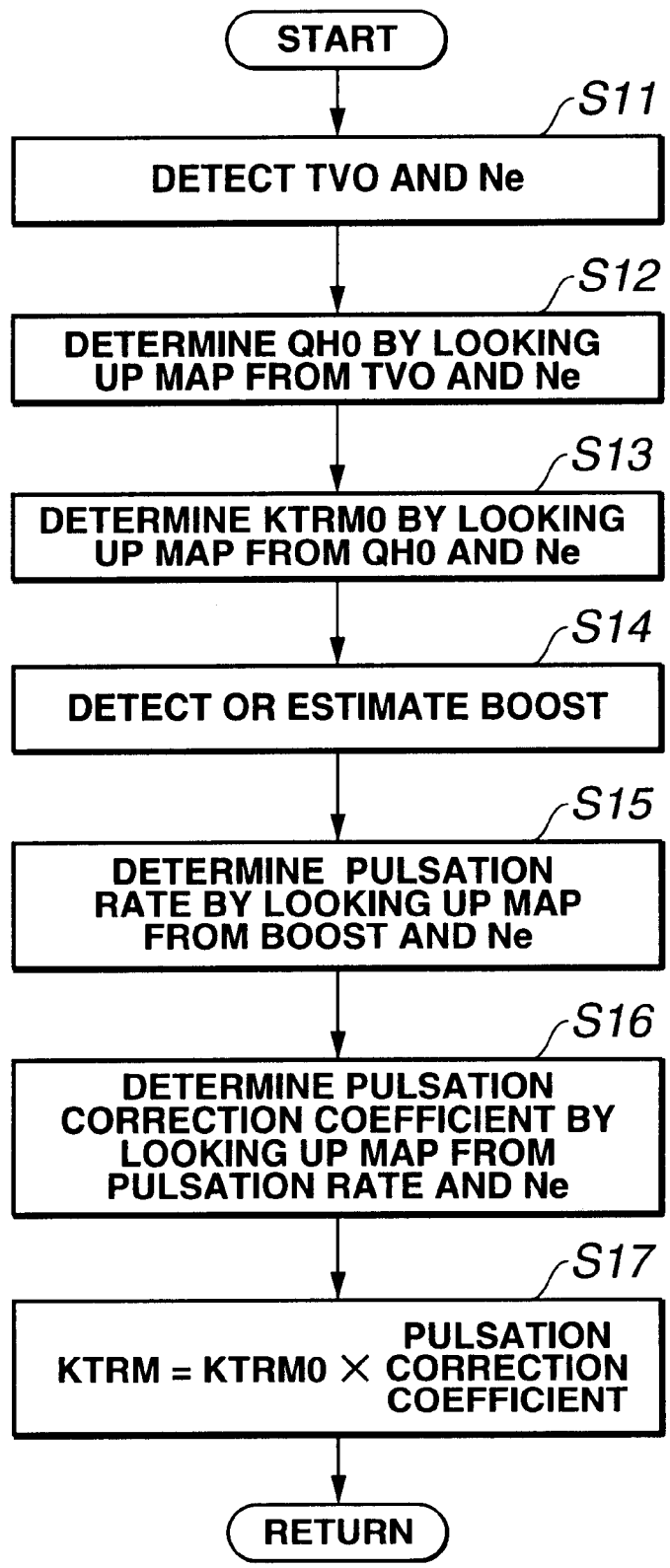
FIG. 4 is a flowchart of a routine executed in the intake air quantity calculating apparatus of FIG. 1 for calculating an airflow error correction term or coefficient.
Figure 5:
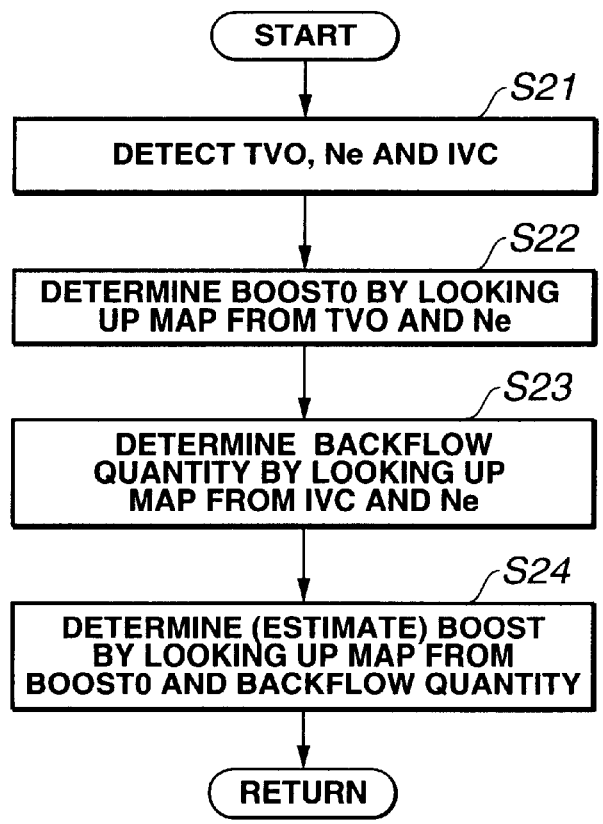
FIG. 5 is a flowchart of a routine executed in the intake air quantity calculating apparatus of FIG. 1 for estimating an intake pipe pressure.

Calculation of the intake air quantity for control of the fuel injection quantity, etc. will be described in detail with reference to the flowcharts of FIGS. 3 to 5. The routines shown in FIGS. 3 to 5 are executed by a microcomputer in control unit 11.

While intake air quantity Qa for control of the fuel injection quantity, etc. is detected basically by hot-wire air flow meter 14, intake air quantity Qa is corrected by air flow error correction term or coefficient KTRM for correcting an error in detection by air flow meter 14 and thereafter used for control of the fuel injection quantity, etc., which will be described in detail hereinafter.

Figure 3:
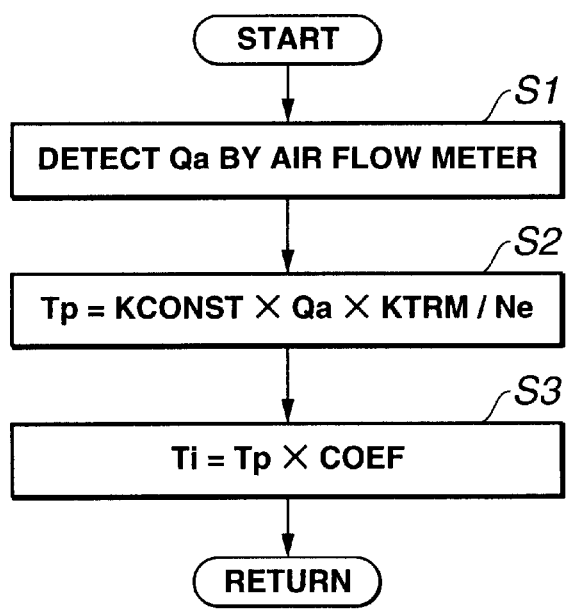
FIG. 3 is a flowchart of a routine executed in the engine of FIG. 1 for calculating a fuel injection quantity.

FIG. 3 is a flowchart of a routine for calculating a fuel injection quantity.

At step S1, intake air quantity Qa detected by hot-wire air flow meter 14 is read.

At step S2, as shown in the following equation, intake air quantity Qa is corrected by air flow error correction term KTRM calculated by the routine of FIG. 4 and thereafter basic fuel injection quantity Tp is calculated from corrected intake air quantity (Qa×KTRM) and engine speed Ne detected by crank angle sensor 12. In this instance, a section for correcting intake air quantity Qa by air flow error correction term KTRM constitutes an intake air quantity correcting section in the intake air quantity calculating apparatus.

$$Tp = KCONST \times Qa \times KTRM / Ne$$

where KCONST is a constant for converting an intake air quantity per unit engine revolution to a fuel injection quantity for attaining a predetermined air-fuel ratio (stoichiometric air-fuel ratio).

At step S3, as shown in the following equation, various corrections are made to basic fuel injection quantity Tp to calculate final fuel injection quantity Ti.

$$Ti = Tp \times COEF$$

where COEF represent various correction coefficients.

By this, control unit 11 outputs a fuel injection pulse signal corresponding to fuel injection quantity Ti to fuel injection valve 10 at a predetermined fuel injection timing to carry out fuel injection.

FIG. 4 shows a routine for calculating air flow error correction term KTRM.

At step S11, throttle valve opening degree TVO detected by throttle sensor 15 and engine speed Ne detected by crank angle sensor 12 are read.

Figure 6:
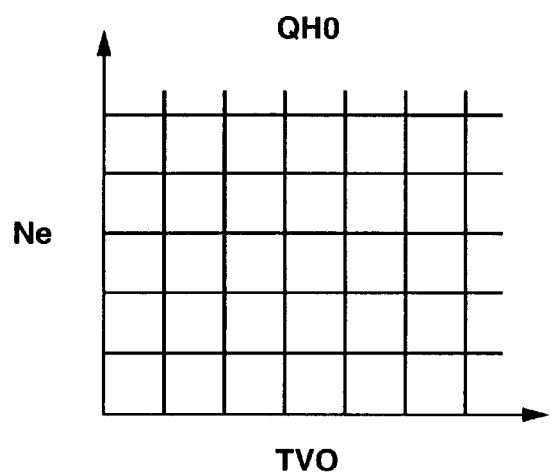
FIG. 6 is a map used in the routine of FIG. 4 for determining a quantity GHO of air passing through a throttle valve.

At step S12, quantity QH0 of air passing through throttle valve (i.e., so called α–N air quantity) is determined by looking up the map of FIG. 6 from throttle valve opening degree TVO (α) and engine speed Ne.

Figure 7:
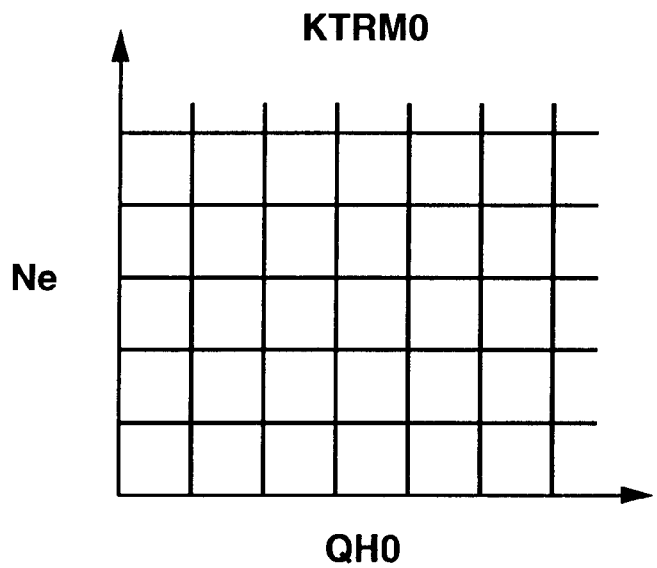
FIG. 7 is a map used in the routine of FIG. 4 for determining an air flow error correction term basic value KTRM0.

At step S13, air flow error correction term basic value KTRM0 (about 0.9 to 1.1) is determined by looking up the map of FIG. 7 from quantity QH0 of air passing through throttle valve and engine speed Ne.

At step S14, in case intake pipe pressure sensor 16 is provided, intake pipe pressure BOOST detected by intake pipe pressure sensor 16 is read, and in case not provided, intake pipe pressure BOOST estimated or determined by the routine of FIG. 5 which will be described hereinafter is read.

Figure 8:
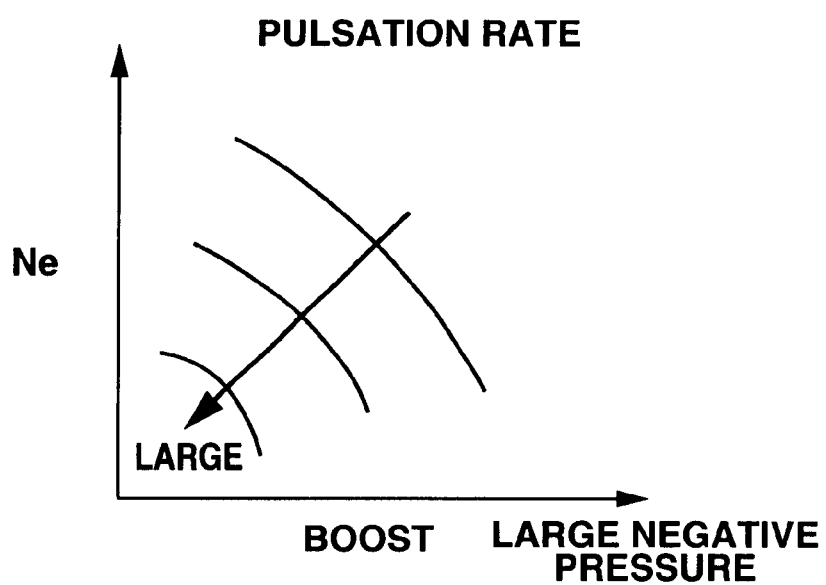
FIG. 8 is a map used in the routine of FIG. 4 for determining a pulsation rate.

At step S15, intake air pulsation rate (%) is determined by looking up the map of FIG. 8 from intake pipe pressure BOOST and engine speed Ne. The map is adapted to determine a larger pulsation rate as intake pipe pressure BOOST becomes closer to the atmospheric pressure and engine speed Ne becomes smaller.

Figure 9:
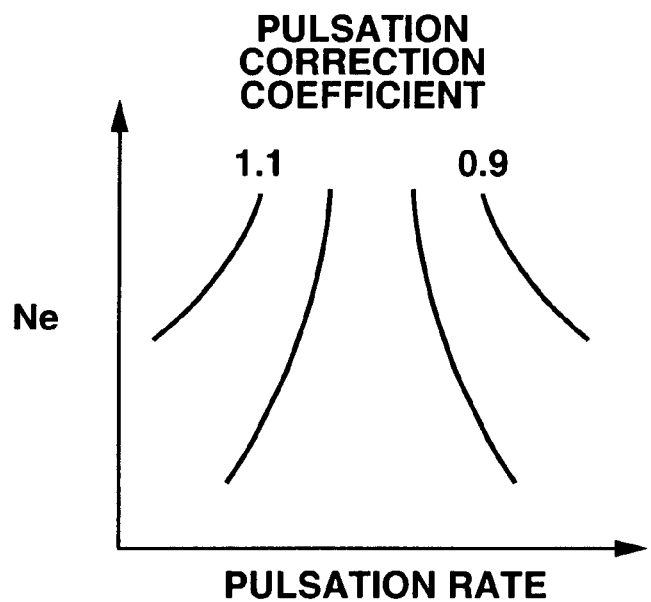
FIG. 9 is a map used in the routine of FIG. 4 for determining a pulsation correction coefficient.

At step S16, pulsation correction coefficient corresponding to air flow error correction term basic value KTRM0 is calculated by looking up the map of FIG. 9 from pulsation rate and engine speed Ne. For example, as the pulsation rate becomes larger, the pulsation correction coefficient is set at a smaller value around 0.9, and as the pulsation rate becomes smaller, the pulsation correction coefficient is set at a larger value around 1.1. Further, the pulsation correction coefficient is set so as to carry out a larger correction as engine speed Ne becomes larger.

At step S17, as shown in the following equation, air flow error correction term basic value KTRM0 is multiplied by the pulsation correction coefficient to calculate air flow error correction term KTRM.

$$KTRM = KTRM0 \times \text{pulsation correction coefficient}$$

In this instance, step S14 constitutes an intake pipe pressure detecting section or estimating section, and step S15 constitutes a pulsation rate calculating section in the intake air quantity calculating apparatus. Further, steps S11 to S13 and S16 to S17 constitute an air flow error correction term calculating section, particularly steps S11 to S13 constitutes a correction term basic value determining section (of the steps, step 12 constitutes a section for determining a quantity of air passing through throttle valve) and steps S16 and S17 constitute a correcting section in the intake air quantity calculating apparatus.

FIG. 5 is a flowchart of a routine for estimating intake pipe pressure BOOST. This routine constitutes an intake pipe pressure estimating section in the intake air quantity calculating apparatus.

At step S21, throttle valve opening degree TVO detected by throttle sensor 15, engine speed Ne detected by crank angle sensor 12 and closing timing IVC of intake valve 5 are read. In this instance, while closing timing IVC of intake valve 5 may be detected directly by the provision of a lift sensor, it can be detected indirectly by the use of a command value in control by the control unit 11, for simplicity in structure and control.

Figure 10:
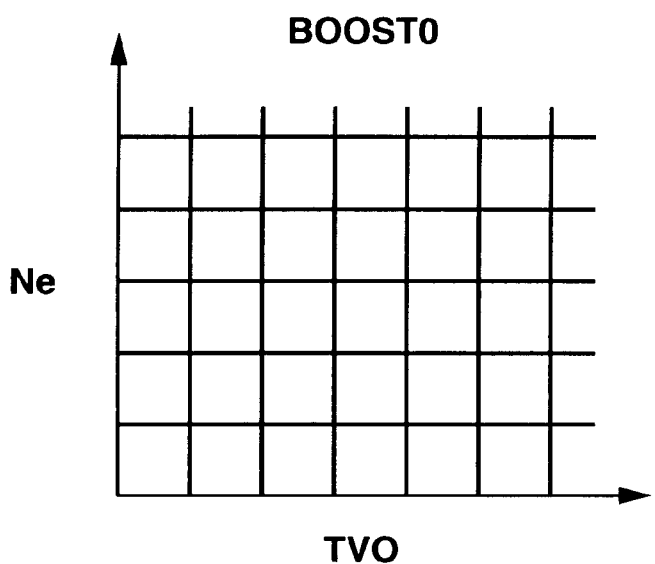
FIG. 10 is a map used in the routine of FIG. 5 for determining an intake pipe pressure basic value BOOST0.

At step S22, intake pipe pressure basic value BOOST0 is determined by looking up the map of FIG. 10 from throttle valve opening degree TVO and intake pipe pressure basic value BOOST0.

Figure 11:
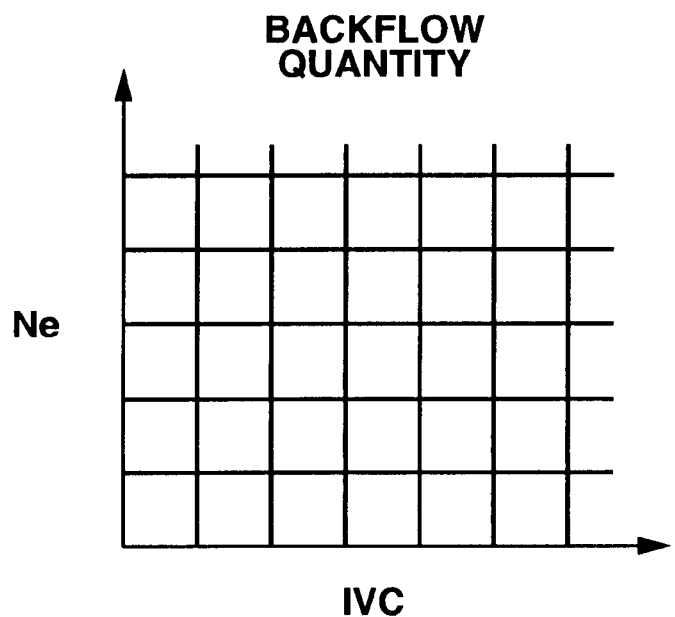
FIG. 11 is a map used in the routine of FIG. 5 for determining a backflow or puff-back quantity.

At step S23, a backflow quantity (i.e., quantity of gas flowing from cylinder back to intake pipe 7) is calculated by looking up the map of FIG. 11 from closing timing IVC of intake valve 5 and engine speed Ne. The map is adapted to determine a larger backflow quantity as closing timing IVC of intake valve 5 is delayed more than the bottom dead center (i.e., as the intake pipe pressure becomes higher). Further, in case closing timing IVC of intake valve 5 is controlled so as to close intake valve 5 at an excessively earlier timing, the intake pipe pressure is cause to become higher, and therefore the backflow quantity is set at a larger value. Further, as engine speed Ne becomes lower or higher than the engine speed at which an inertia supercharging effect becomes maximum, the intake pipe pressure is caused to become higher, so that the backflow quantity is set at a larger value. In the meantime, in addition to closing timing IVC of intake valve 5 and engine speed Ne, opening timing IVO of intake valve 5 and closing timing EVC of exhaust valve 6 can be taken into consideration.

Figure 12:
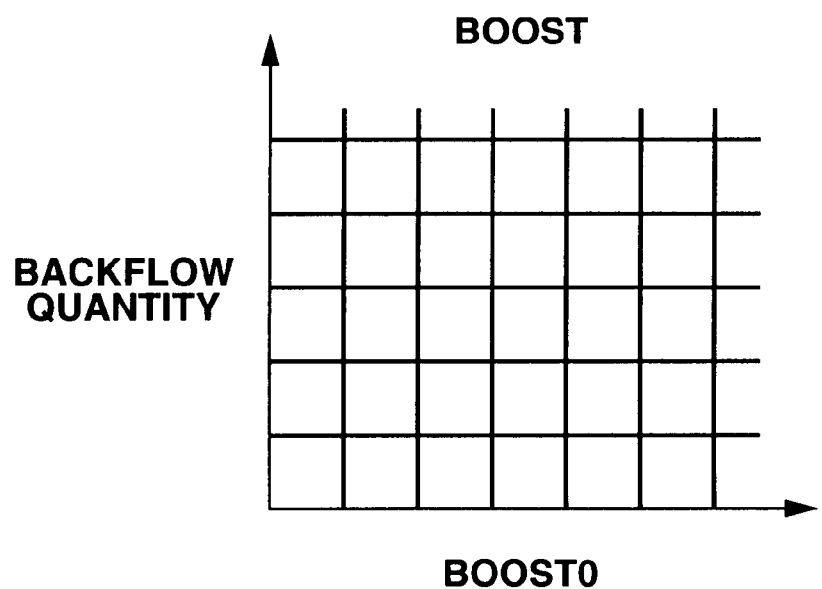
FIG. 12 is a map used in the routine of FIG. 5 for determining an intake pipe pressure BOOST.

At step S24, intake pipe pressure BOOST is determined or estimated by looking up the map of FIG. 12 from intake pipe pressure basic value BOOST0 and the backflow quantity. This map is adapted to determine intake pipe pressure BOOST by correcting intake pipe pressure basic value BOOST0 in a way as to cause intake pipe pressure basic value BOOST0 to become closer to the atmospheric pressure as the backflow quantity becomes larger.

In this instance, step 22 constitutes an intake pipe pressure basic value determining section, and steps 23 and 24 constitute a correcting section in the intake air quantity calculating apparatus.

From the foregoing, it will be understood that according to the present invention, the intake air pulsation rate is determined on the basis of intake pipe pressure BOOST and engine speed Ne, and airflow error correction term KTRM is determined on the basis of the intake air pulsation rate such that in an engine with a variable valve timing control mechanism wherein the load of the engine (i.e., throttle valve opening degree and the engine speed) and the magnitude of pulsation do not correspond to each other, the accuracy in calculation of intake air quantity (Qa×KTRM) can be improved since accurate correction according to the magnitude of pulsation is made thereto.

By this, in the fuel injection quantity control, the accuracy in the control of the air-fuel ratio is improved, and the exhaust efficiency and the engine performance are improved. It is needless to say that such improvements can be reflected on the ignition timing control other than the fuel injection quantity control.

In the meantime, in an engine equipped with a variable valve timing control mechanism but not with a throttle valve, it will do to carry out the above described calculation by assuming that the throttle valve opening degree TVO is held fully open.

The entire contents of Japanese Patent Application P11-223683 (filed Aug. 6, 1999) are incorporated herein by reference.

Although the invention has been described above reference to a certain embodiment of the invention, the invention is not limited to the embodiment described above. Modifications and variations of the embodiment described above will occur to those skilled in the art, in light of the above teachings.

The scope of the invention is defined with reference to the following claims.

What is claimed is:

1. An intake air quantity calculating apparatus for an internal combustion engine with a variable valve timing control mechanism, comprising:
   an air flow meter for detecting an intake air quantity of the engine; and
   a calculator for calculating a corrected intake air quantity through correction of said intake air quantity detected by said air flow meter;

said calculator including:

a pulsation rate determining section for determining an intake air pulsation rate on the basis of an intake pipe pressure and an engine speed of the engine;

an air flow error correction term calculating section for calculating an air flow error correction term for correction of an error of said intake air quantity detected by said air flow meter, on the basis of said intake air pulsation rate; and a correcting section for correcting said intake air quantity detected by said air flow meter by using said air flow error correction term.

2. An intake air quantity calculating apparatus according to claim 1, wherein said air flow error correction term calculating section comprises a correction term basic value determining section for determining a basic value of said air flow error correction term on the basis of a throttle valve opening degree of the engine and said engine speed, and a correcting section for correcting said basic value of said air flow correction term on the basis of at least said intake air pulsation rate and thereby calculating said air flow error correction term.

3. An intake air quantity calculating apparatus according to claim 2, wherein said correction term basic value determining section comprises a section for determining a quantity of air passing though a throttle valve of the engine on the basis of said throttle valve opening degree and said engine speed, and determines said basic value of said air flow error correction term from said quantity of air passing through the throttle valve and said engine speed.

4. An intake air quantity calculating apparatus according to claim 2, wherein said correcting section for correcting said basic value of said air flow correction term corrects said basic value of said air flow error correction term further on the basis of said engine speed.

5. An intake air quantity calculating apparatus according to claim 1, further comprising an intake pipe pressure sensor disposed in an intake system of the engine for detecting said intake pipe pressure.

6. An intake air quantity calculating apparatus according to claim 1, wherein said calculator further comprises an intake pipe pressure estimating section for estimating said intake pipe pressure, said intake pipe pressure estimating section including an intake pipe pressure basic value determining section for determining an intake pipe pressure basic value from a throttle valve opening degree of the engine and said engine speed, and a correcting section for correcting said intake pipe pressure basic value on the basis of at least a closing timing of an intake valve of the engine.

7. An intake air quantity calculating apparatus according to claim 6, wherein said correcting section for correcting said intake pipe pressure basic value corrects said intake pipe pressure basic value on the basis of said engine speed in addition to said closing timing of said intake valve.

8. An internal combustion engine with a variable valve timing control mechanism, comprising:

an air flow meter for detecting an intake air quantity of the engine; and a calculator for calculating a corrected intake air quantity through correction of said intake air quantity detected by said air flow meter;

said calculator including:

pulsation rate determining means for determining an intake air pulsation rate on the basis of an intake pipe pressure and an engine speed of the engine;

means for determining an air flow error correction term for correction of an error of said intake air quantity detected by said air flow meter, on the basis of said intake air pulsation rate; and means for correcting said intake air quantity detected by said air flow meter by using said air flow error correction term.

9. A method of calculating an intake air quantity of an internal combustion engine with a variable valve timing control mechanism, through correction of an intake air quantity detected by an air flow meter, the method comprising:

calculating an intake air pulsation rate on the basis of an intake pipe pressure and an engine speed of the engine;

calculating an air flow error correction term for correction of an error of said intake air quantity detected by air flow meter, on the basis of said intake air pulsation rate; and correcting said intake air quantity detected by said air flow meter by using said air flow error correction term.

* * * * *